United States Patent [19]

Watanabe et al.

[11] Patent Number: 4,846,942

[45] Date of Patent: Jul. 11, 1989

[54] PROCESS FOR PRODUCING A FILM OF SM-CO ALLOY

[75] Inventors: Touru Watanabe, Atsugi; Nobuji Kato, Hamamtsu, both of Japan

[73] Assignee: Yamaha Corporation, Japan

[21] Appl. No.: 198,170

[22] Filed: May 24, 1988

[30] Foreign Application Priority Data

Jun. 30, 1987 [JP] Japan .................................. 62-163465

[51] Int. Cl.$^4$ .............................................. C25D 3/56
[52] U.S. Cl. ................................................ 204/58.5
[58] Field of Search ........................................ 204/58.5

[56] References Cited

U.S. PATENT DOCUMENTS 4,071,415 1/1978 Wong .................................. 204/58.5

Primary Examiner—T. M. Tufariello
Attorney, Agent, or Firm—Lerner, David, Littenberg, Krumholz & Mentlik

[57] ABSTRACT

Formation of a Sm-Co alloy film is carried out by means of wet plating system which is easily practicable and well suited for treatment intricate and/or large configurations. The system uses a plating bath which contains chlorides of samarium and cobalt dissolved with non-aqueous solvent such as formamide. Substantial absence of any aqueous components in the plating bath assures production of a plated film of high purity and quality. Content of samarium in the product can feeely be adjusted by choice of the current density of direct current to be employed in the electrolytic plating.

16 Claims, 2 Drawing Sheets

PROCESS FOR PRODUCING A FILM OF SM-CO ALLOY

BACKGROUND OF THE INVENTION

The present invention relates to improved process for producing a film of Sm (samarium)-Co(Cobalt) alloy, and more particularly relates to an improvement in production, by means of plating, of a Sm-Co alloy film well suited to magnetic applications such as magnetic recording media.

Production of Sm-Co alloy films is conventionally carried out by sputtering and vacuum evaporation. Such conventional processes are in general very high in cost of installation but rather low in productivity. In addition, these conventional processes are quite unsuited for production of Sm-Co alloy films on intricate and/or large configurations.

As a substitute for such defective processes, wet-plating process has recently been proposed. For example, see pages 30 and 31 of "the Summary of Lectures at the 72nd Academic Seminar" issued by the corporation aggregate, Institute of Metal Surface Technology in Japan. This newly proposed process is carried out in a non-aqueous plating bath which includes samarious nitrate and cobalt nitrate dissolved with propylene carbonate. In this case, however, the nitrates used both contain crystal water. As a consequence, aqueous component is inevitably contained in the plating bath through dissolution of the nitrates. It is generally known that presence of such aqueous component in a plating both of non-aqueous solvent disturbs smooth electro-crystallization of base metal such as Sm-Co alloy. So, no plated film of high qualities can be obtained by such a wet-plating process.

SUMMARY OF THE INVENTION

It is the object of the present invention to enable smooth production of a Sm-Co alloy film or layer of high qualities through plating which is well suited for treatment of even intricate and/or large configurations.

In accordance with the basic aspect of the present invention, plating is carried out in a bath which contains samarium chloride and cobalt chloride dissolved with non-aqueous solvent.

DESCRIPTION OF THE PREFERRED EMBODIMENTS

Figure 1:
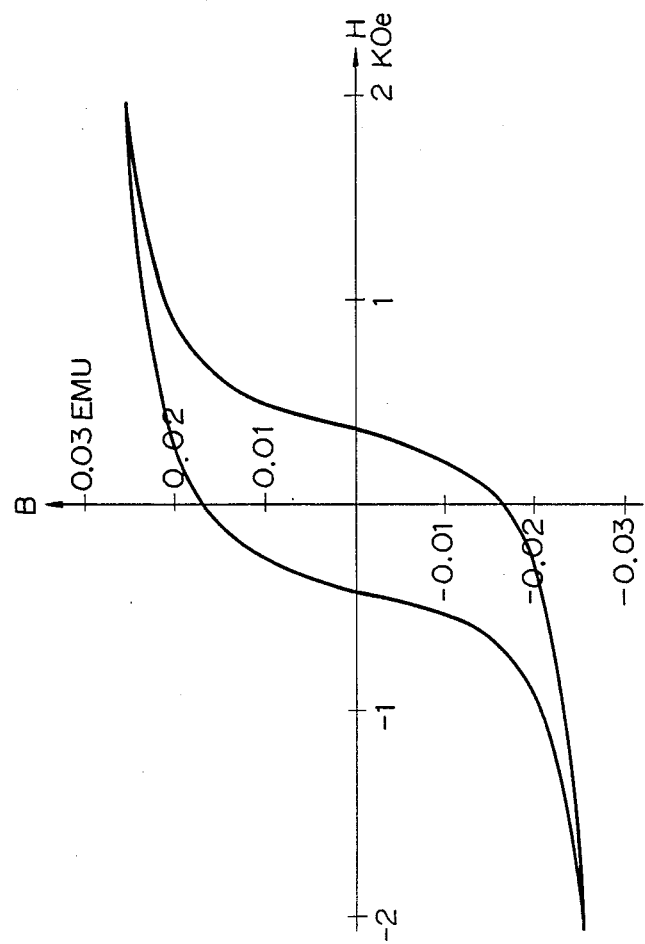
FIGS. 1 and 2 are graphs for showing magnetic characteristics of Sm-Co alloy films produced in Examples of the present invention.

As stated above, in plating bath used in the present invention contains samarium chloride and cobalt chloride dissolved with non-aqueous solvent. The samarium chloride used herein is given in the form of anhydrous $SmCl_2$ and $SmCl_3$. In the case of water containing $SmCl_3$, the material is heated in dry HCl stream for dehydration. The cobalt chloride used herein is given in the form of anhydrous $CoCl_2$. In the case of water containing $CoCl_3$, the material is heated in dry HCl stream. Although formamide is majority used for the non-aqueous solvent, acetoamide is usable too. Amines such as ethylenediamine and pyridine may be added to the plating bath as a complexing agent. All the materials should have high purity and should preferably be prepared by means of distillation and/or recrystallization.

The concentration of the samarium chloride in the plating bath should preferably be in a range from 0.001 to 2 mol., and more preferably from 0.005 to 0.5 mol. per 1l. of the non-aqueous solvent. Whereas the concentration of the cobalt chloride in the plating bath should preferably be in a range from 0.001 to 2 mol., and more preferably from 0.005 to 0.5 mol. per 1 l of the non-aqueous solvent. The content ratio in mol. between the samarium chloride and the cobalt chloride should preferably be in a range from 1:1 to 1:20, and more preferably from 1:2 to 1:15. The concentration of the amines in the plating bath should preferably be in a range from 0.01 to 1 mol., and more preferably from 0.02 to 0.2 mol. per 1l. of the non-aqueous solvent.

In order to avoid mixing of moisture and oxygen in the air into the plating bath, preparation of the bath should preferably be carried out in a deoxidized dry nitrogen environment, e.g. in a globe box.

Production of a Sm-Co alloy film or layer is carried out in such a plating bath via electrolysis. Insoluble material such as platinum and carbon is used for the anode and material such as copper, nickel, platinum and electro-conductive glass is used for the cathode in order to electrodeposit a Sm-Co alloy film on the cathode. The plating bath should preferably be kept at a temperature in a range from the room temperature to 120° C. The bath may either be stirred or not stirred. For electrolysis, direct current, direct-alternative superposed current or pulse current is usable. The current density should preferably be in a range from 10 to 200 $mA/cm^2$. A high current density would result in high content of samarium in the alloy film. Thus, the composition of the alloy film can be freely adjusted by choice of the current density. Plating time depends on the desired thickness of the alloy film and plating conditions. Generally, plating is continued for a period of 1 to 30 min.

After electrodeposition of the smooth Sm-Co alloy film on the cathode, the same is heated in order to exhibit magnetic properties.

Thus, in accordance with the present invention, a high quality Sm-Co alloy film can be obtained by means of wet plating process which is very simple in control. Since almost no aqueous component is present in the plating bath, the produced alloy film is notably high in purity and high in quality. In addition, as stated above, content of samarium in the produced alloy film can be freely adjusted by choice of the current density for the electrolysis.

DESCRIPTION OF EXAMPLES.

Example

Hexahydro $SmCl_3$ used for the samarium chloride was heated at about 300° C. in dry HCl stream for dehydration. Dehydrated $CoCl_2$ was used for the cobalt chloride. Formamide on market and distilled under reduced pressure in nitrogen was used for the non-aqueous solvent and ethylene diamine was used for the amine. These components were blended at the following concentrations to form a plating bath.

Cobalt chloride: 0.09 mol. per 1l. of solvent
Samarium chloride: 0.01 mol. per 1l. of solvent
Ethylene diamine: 0.01 mol. per 1l. of solvent A closed-type container was used for electrolysis and the bath and the space in the container were substituted with deoxidized dry nitrogen.

A platinum plate was used for the anode and a conductive glass plate, i.e. a glass plate coated with a thin film of oxidized indium tin, was used for the cathode. During electrolysis, the bath was stirred with a magnetic stirrer and kept at 20° C. Direct current of 10 mA/cm² current density and 10 C/cm² current quantity was used.

A plated film of a metallic luster was formed on the cathode with a thickness of about 1μm. The film contained 16% by weight of samarium and 84% by weight of cobalt.

The plated film was heated at 600° C. for 1 hour in a vacuum environment and the resultant magnetic characteristics is shown in FIG. 1. As is clear in the graph, the plated film exhibited a coercive force of 404 oersted.

Example 2

The components of Example 1 were blended at the following concentrations.

Cobalt chloride: 0.09 mol. per 1l. of solvent
Ethylene diamine: 0.09 mol. per 1l. of solvent After this initial blending, samarium chloride was added at a concentration of 0.01 mol. per 1l. of solvent. The conditions in the container were adjusted as in Example 1.

A platinum plate was used for the anode and a conductive glass plate was used for the cathode. Electrolysis was carried out at 20° C. under emanation of ultrasonic waves of 47kHz frequency. Current density was 20mA/cm² and current quantity was 10 C/cm².

Figure 2:
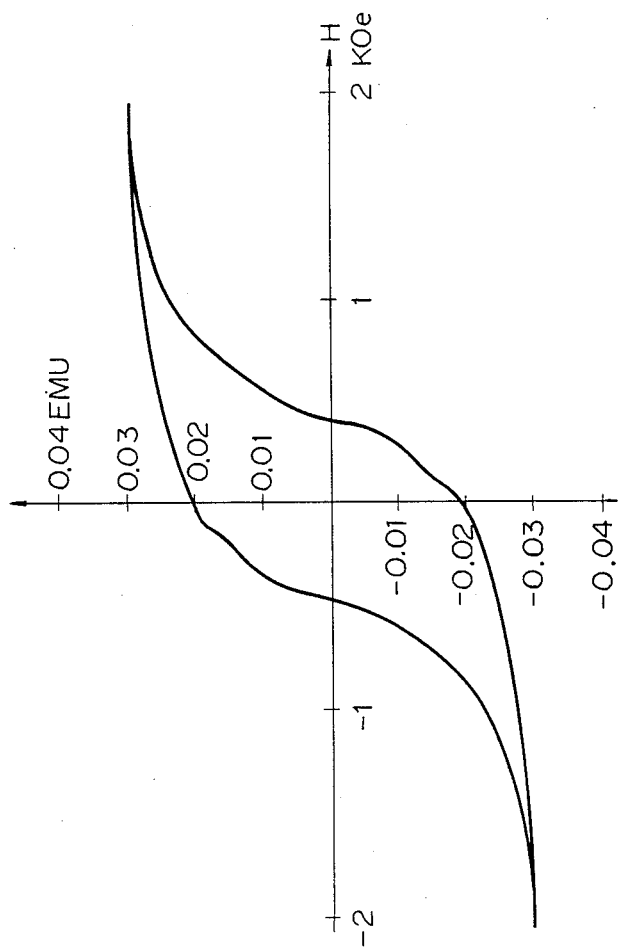

A plated film of a metallic luster was obtained on the cathode with a thickness of about 1μm. The film contained 22% by weight of samarium and 78% by weight of cobalt. The plated film was then heated at 600° C. for one hour in an argon environment and the resultant magnetic characteristics is shown in FIG. 2. It is clearly seen from the graph that the plated film exhibited a coercive force of 447 oersted.

Example 3

A plated film was produced with components and in a manner same as in Example 2 except 40 mA/cm² current density. The film contained 27% by weight of samarium and 73% by weight of cobalt.

Example 4

A plated film was produced with components and in a manner same as in Example 2 except 50mA/cm² current density. The film contained 31% by weight of samarium and 69% by weight of cobalt.

What is claimed is:

1. A process for producing a film of samarium-cobalt (Sm-Co alloy) comprising the steps of preparing a plating bath containing a 1:1 to 1:20 molecular ratio of anhydrous samarium chloride and samarium cobalt chloride dissolved in a non-aqueous solvent.

2. The process according to claim 1 wherein said samarium chloride is selected from the group consisting of anhydrous $SmCl_2$ and $SmCl_3$.

3. The process according to claim 1 wherein said non-aqueous solvent is selected from the group consisting of formamide and acetoamide.

4. The process according to claim 1 wherein said plating bath further contains 0.01 to 1.0 mole per liter of solvent of an amine selected from the group consisting of ethylene diamine and pyridine.

5. The process according to claim 1 wherein the concentration of said samarium chloride is within the range of 0.001 to 2 mol. per liter of said non-aqueous solvent.

6. The process according to claim 1 wherein the concentration of said cobalt chloride is within the range of 0.001 to 2 mol. per liter of said non-aqueous solvent.

7. The process according to claim 1 wherein said plating bath is maintained within the range of room temperature to 120° C.

8. The process according to claim 1 wherein said plating process utilizes an electric current having a density of 10 to 200 mA/cm².

9. The process according to claim 1 wherein said plating bath is subjected to electrolysis.

10. The process according to claim 1 wherein the plating bath is prepared in a deoxygdized dry nitrogen environment.

11. The process according to claim 1 wherein the thickness of the Sm-Co alloy film depends on the plating time within the range of 1–30 minutes.

12. The process according to claim 1 including the step of heating said plated Sm-Co alloy film to provide magnetic properties to said film.

13. The process according to claim 9 wherein direct current is used in the electrolysis step.

14. The process according to claim 9 wherein direct-alternative superposed current is used in the electrolysis step.

15. The process according to claim 9 wherein pulse current is used in the electrolysis step.

16. The process according to claim 9 wherein a high current density is used in the electrolysis step to yield a high content of samarium in the Sm-Co alloy film.

* * * * *